United States Patent [19]

Kingsland

[11] 4,008,958
[45] Feb. 22, 1977

[54] OPTICAL SYSTEM EFFECTING IMAGE ROTATION

[75] Inventor: David O. Kingsland, Fairport, N.Y.

[73] Assignee: Xerox Corporation, Stamford, Conn.

[22] Filed: Feb. 24, 1975

[21] Appl. No.: 552,003

[52] U.S. Cl. .................................. 355/51; 355/8; 355/11; 355/66
[51] Int. Cl.² ................ G03B 27/48; G03B 27/50; G03B 27/70; G03G 15/28
[58] Field of Search .................. 355/3 R, 8, 11, 66, 355/50, 51

[56] References Cited
UNITED STATES PATENTS 3,574,459   4/1971   Hartwig .............................. 355/66

Primary Examiner—Richard A. Wintercorn
Attorney, Agent, or Firm—Robert J. Bird

[57] ABSTRACT

An optical system for strip scanning of an object in both directions of relative reciprocal motion between the object and the optical system. The object is first scanned in one direction, then the image orientation is rotated 180° about the axis of propagation for scanning in the reverse direction. Properly oriented images are thus projected onto an image surface and move in the same direction during both directions of scan.

3 Claims, 3 Drawing Figures

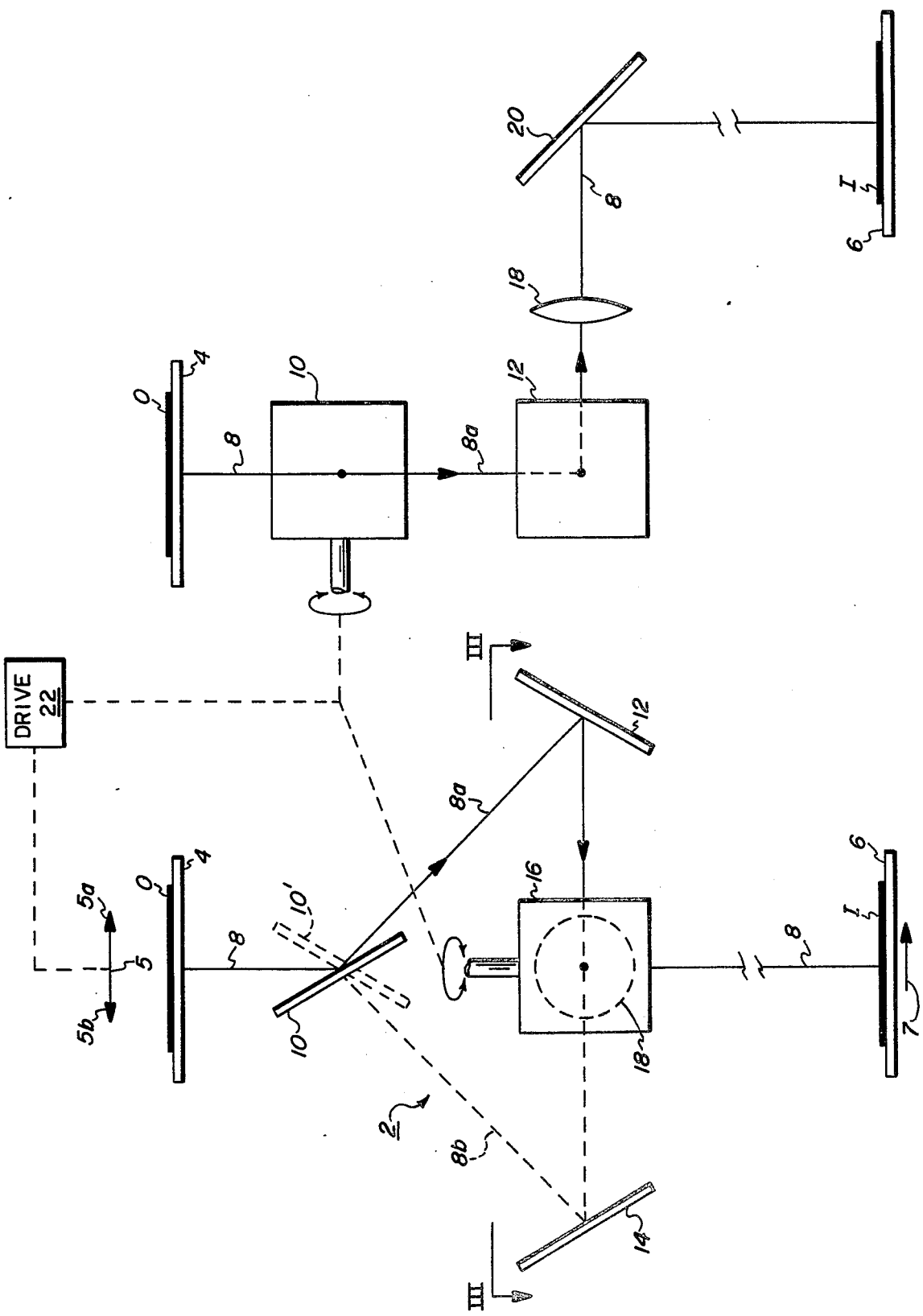

4,008,958

OPTICAL SYSTEM EFFECTING IMAGE ROTATION

BACKGROUND OF THE INVENTION

This invention relates to optical systems and in particular to a strip scanning optical system for scanning an object and progressively projecting a composite image of the same at an image surface, such as a xerographic or other photosensitive surface in a photocopying process.

There are three general types of strip scanning arrangements known to the prior art. In one, the optical system is fixed and the object and image surface move relative to the optics. In the second, the object is fixed and the optical system and image surface move at appropriate speeds relative to the object. In the third, the object is fixed and is scanned by a rotating mirror to relay an image of the object onto a moving image surface.

Typically, these prior art systems have in common the fact that they are capable of projecting a usable image only in one direction of scan motion. The return motion, whether it be return of the object, the optics, or the mirror, projects an image onto the moving image surface, but the image is moving in a direction opposite to that of the image surface and is therefore useless. Accordingly, the prior art has variously resorted to flyback arrangements to minimize "lost time" involved in the return motion of the scan mechanism. One system by which to accomplish scanning in both directions of object reciprocation is shown in U.S. Pat. No. 3,574,459 to Hartwig and Schnell, in which a single optical axis is rotated 180° between successive scans by a prism.

SUMMARY OF THE INVENTION

It is an object of the present invention to provide a novel form of strip scanning optical system which is capable of projecting a useful image of an object in both directions of reciprocal scan movement, thus greatly decreasing lost time in the operation of a photocopying apparatus.

Another object is to provide such a strip scanning optical system which does not require the cyclic reciprocation of the image surface in addition to either the object or the optics.

Another object is to provide an optical system with a novel means to selectively effect the 180° rotation of an image about its axis of propagation.

Briefly, this invention is practiced in one form by an optical system having alternative optical paths between object and image.

For a better understanding of this invention, reference is made to the following detailed description given in connection with the accompanying drawings.

DRAWINGS

FIG. 1 is a front elevation view of an optical system according to the present invention.

FIG. 2 is a side elevation view from the right side of FIG. 1.

DESCRIPTION

Figure 3:
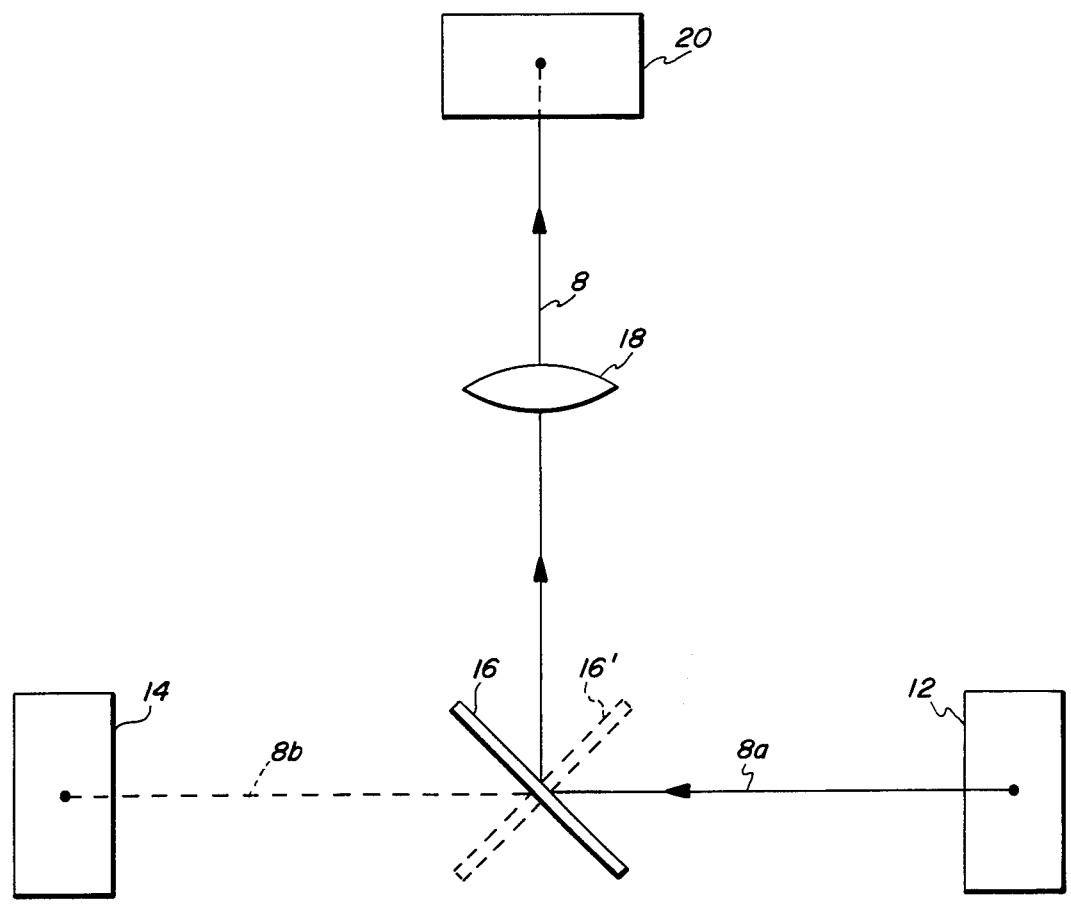
FIG. 3 is a plan view taken along the line III—III of FIG. 1.

Referring now to FIG. 1, the optical system of this invention is generally indicated at 2 and extends between an object plane or surface 4 and an image plane or surface 6 along an optical axis 8. The optical axis 8 of the system includes parallel branch paths 8a and 8b.

A first reflector 10 is located along the optical axis and is mounted for rotation between a first position shown in solid line in FIG. 1 and a second position shown in phantom line. In its first position, reflector 10 deflects optical axis 8 along branch path 8a to a second fixed reflector 12. In its second or alternate position, reflector 10 deflects optical axis 8 along branch path 8b to an alternate second reflector 14. Reflector 12 deflects the branch optical path 8a to a third reflector 16 which is mounted for rotation between alternate positions shown in FIG. 3 as solid and phantom lines respectively.

A projection lens 18 is disposed along the optical axis 8 to project an image I of an object O from the object surface 4 to the image surface 6. A fourth reflector 20 deflects the optical axis toward the image surface 6. The fourth reflector may or may not be necessary, depending on whether the optical system of this invention is used in an image transfer type system or in a direct imaging system. An image transfer system requires an even number of reflections (or zero reflections) between object and image and a direct imaging system requires an odd number of reflections. In any case, the particulars of that part of the optical system from the lens to the image surface are not material to this invention.

With the first reflector 10 in its first position (solid line) and the third reflector 16 in its first position (solid line) the optical path 8 extends from object surface 4 to first reflector 10, to second reflector 12, to third reflector 16, to the projection lens 18, and on to the image surface 6. Along this path 8, 8a, light from an object O on the object surface 4 propagates to form an Image I at the image surface 6. The image wavefront propagating along this axis of propagation is, after its reflection from the third reflector 16, in a first orientation relative to the axis of propagation 8.

With the first reflector 10 in its second position (phantom lines) indicated at 10′, and with the third reflector in its second position (phantom lines) indicated at 16′, the optical path 8 extends from object surface 4 to the first reflector 10, to alternate reflector 14, to third reflector 16, to the projection lens 18, and on to the image surface 6. Along this path 8, 8b, light from an object O on the object surface 4 propagates to form an image I at the image surface 6. The image wavefront propagating along this axis of propagation is, after its reflection from the third reflector 16, in a second orientation relative to the axis of propagation 8. This second image orientation is rotated 180° about the axis of propagation relative to the first image orientation.

In a photocopying environment, the image I of object O is projected onto a moving photoreceptor at the image surface 6. This continual uni-directional movement of the photoreceptor is indicated by the arrow 7. In a scanning mode of operation, the object O is reciprocated on the object plane 4 relative to the optical axis 8 along a path of travel indicated by the arrow 5. During this scanning, only a narrow band of the object is exposed to the photoreceptor at any time. This continual and progressive exposure results in a composite image of the scanned object. When the object O is moving in the scan direction 5a, its image is propagated along the optical axis 8 and its branch path 8a and laid down on the moving photoreceptor, in synchronism with the photoreceptor, and in a first orientation. When the object O is moved in the scan direction 5b, its image is propagated along the optical axis 8 and its branch path 8b and laid down on the moving photoreceptor, still in synchronism with the photoreceptor, in a second orientation, rotated 180° about the axis of propagation from the first orientation. Mirrors 10 and 16 are in their solid line positions during scanning in direction 5a, and in their phantom line positions 10' and 16' respectively for scanning in direction 5b.

A drive means represented at 22 is operatively connected to the optical system to effect relative reciprocations between the object O and the optical axis 8. Drive means 22 is also operatively connected to the first reflector 10 and the third reflector 16 to rotate the two reflectors between their alternate positions at one or the other end of reciprocatory movement between object O and optical axis 8. The drive means 22 may take several forms, the details of which are not material to the present invention. The essential thing is that the reflectors 10 and 16 are in synchronism with the reciprocating motion of the object O. Thus, when the object O is moving in scan direction 5a, reflectors 10 and 16 are in position to relay an image of the object along optical axis 8 and its branch path 8a. At the end of the stroke in direction 5a, and before the return stroke in direction 5b, reflectors 10 and 16 are shifted to positions 10' and 16' so as to relay the image along optical axis 8 and its branch path 8b.

Reduced to its basics, this invention involves rotating a plane 180° about each of the coordinate axes lying in the plane. The resultant effect of this is to rotate the plane 180° about the third coordinate axis, the axis normal to the plane. In terms of an image projection system as is involved here, the propagating image wavefront is taken as a plane for the purpose of a frame of reference in describing and defining the geometry. The axis of propagation of the image is the axis normal to the wavefront plane and is the axis about which it is desired to rotate the image by 180°. Such concepts in the claims as image wavefront, planar wavefront, and coordinate axes lying in the wavefront, are not to be strictly construed as limited to an actual plane wavefront environment. The planar wavefront image propagation concept is simply a useful aid to understanding the invention.

In the present case, the image wavefront propagating along axis 8, 8a is rotated 90° about each of the axes lying in the wavefront plane. Similarly, the image wavefront propagating along axis 8, 8b is rotated 90° about each of the axes lying in the wavefront plane, but in directions opposite to the rotations along axis 8, 8a. The total relative rotational displacement of the image wavefront plane, between scans in directions 5a and 5b, is therefore 180° about each of its axes with a resultant 180° rotation of the image wavefront about its axis of propagation.

It will be appreciated that the invention described herein provides an optical system with a novel means to selectively effect the 180° rotation of an image about its axis of propagation. Such a system can find practical use in a scanning photocopying environment since it enables the scanning and projecting of ordered images during both directions of reciprocal scan movement.

The description given above has been with reference to a system in which the optics are stationary and the object is reciprocated. While this appears to be preferable, it will be appreciated that the concept of the invention is not limited to such an arrangement. It is, of course, possible to have the object remain stationary and to have the optical system reciprocate relative to it.

The foregoing description of an embodiment of this invention is given by way of illustration and not of limitation. The concept and scope of the invention are limited only by the following claims and equivalents thereof which may occur to others skilled in the art.

What is claimed is:

1. An optical scanning system for projecting an image of an object from an object plane to an image plane and having an optical axis including first and second alternate optical paths extending between said object plane and said image plane, said image being in a first orientation at said image plane when projected along said first optical path and in a second orientation, rotated 180° about the axis of propagation from said first orientation, when projected along said optical path, said system including:

a lens to project and image from said object plane to said image plane, a photoreceptor disposed for uni-directional motion at said image plane, scan drive means for effecting relative reciprocatory scanning motion of said object and said optical axis, optical path drive means to place said object plane and said image plane in optical communication successively along said first and said second alternate optical path, and to switch between one to the other of said alternate optical paths at the end of said reciprocatory motion in each direction, said first alternate optical path including first, second, and third reflectors with said first and third reflectors being in first alternate positions, to rotate an image wavefront propagating from said object in first directions of rotation about each of two orthogonal axes lying in the plane of said wavefront, said second alternate optical path including first, alternate second, and third reflectors, with said first and third reflectors being in second alternate positions, to rotate an image wavefront propagating from said object in second directions of rotation opposite to said first directions of rotation about each of said orthogonal axes lying in the plane of said wavefront, said first and third reflectors being common to both said first and second alternate optical paths, said optical path drive means being operatively connected to said first and third reflectors, whereby said image wavefront propagating along said first alternate optical path is rotationally displaced by 180° about its axis of propagation relative to said image wavefront propagating along said second alternate optical path so as to project an ordered image of said object onto said moving photoreceptor during both direction of reciprocatory scanning motion.

2. An optical system for projecting an image of an object from an object plane, in an image wavefront propagating along an axis of propagation, to an image plane, including:

a lens to project an image from said object plane to said image plane, a first reflector selectively positionable in first and second alternate positions in said axis of propagation, a third reflector selectively positionable in first and second alternate positions in said axis of propagation, said first reflector, a second reflector, and said third reflector forming a first alternate optical path when said first and third reflectors are in their first alternate positions, and effective to rotate an image wavefront propagating from said object in first directions of rotation about each of two orthogonal axes lying in the plane of said wavefront, said first reflector, an alternate second reflector, and said third reflector forming a second alternate path when said first and third reflectors are in their second alternate positions, and effective to rotate an image wavefront propagating from said object in second directions of rotation opposite to said first directions of rotation about each of said orthogonal axes lying in the plane of said wavefront, whereby said image wavefront propagating along said first alternate optical path is rotationally displaced by 180° about its axis of propagation at said image plane relative to said image wavefront propagating along said second alternate optical path.

3. An optical scanning system for projecting an image of an object from an object plane, in an image wavefront propagating along an axis of propagation, to an image plane, including:
 a lens to project an image from said object plane to said image plane,
 a photoreceptor disposed for uni-directional motion at said image plane,
 drive means for effecting relative reciprocatory scanning motion of said object and said optical axis,
 a first reflector selectively positionable in first and second alternate positions in said axis of propagation,
 a third reflector selectively positionable in first and second alternate positions in said axis of propagation,
 said first reflector, a second reflector, and said third reflector forming a first alternate optical path when said first and third reflectors are in their first alternate positions, and effective to rotate an image wavefront propagating from said object in first directions of rotation about each of two orthogonal axes lying in the plane of said wavefront,
 said first reflector, an alternate second reflector, and said third reflector forming a second alternate path when said first and third reflectors are in their second alternate positions, and effective to rotate an image wavefront propagating from said object in second directions of rotation opposite to said first directions of rotation about each of said orthogonal axes lying in the plane of said wavefront,
 optical path drive means to place said first and third reflectors in their first alternate positions for a first direction of said scanning motion and in their second alternate positions for the reverse direction of said scanning motion,
 whereby said image is projected in a first orientation during scanning in said first direction and in a second orientation rotated 180° about said axes of propagation from said first orientation during scanning in said reverse direction.

* * * * *